(12) United States Patent
Reiter et al.

(10) Patent No.: US 9,520,786 B2
(45) Date of Patent: Dec. 13, 2016

(54) REGULATING DEVICE FOR A MULTI-PHASE VOLTAGE CONVERTER

(75) Inventors: Tomas Reiter, Munich (DE); Dieter Polenov, Munich (DE); Hartmut Proebstle, Augsburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 749 days.

(21) Appl. No.: 12/561,693

(22) Filed: Sep. 17, 2009

(65) Prior Publication Data

US 2010/0073971 A1    Mar. 25, 2010

(30) Foreign Application Priority Data

Sep. 19, 2008 (DE) .................. 10 2008 048 017

(51) Int. Cl.
| | |
|---|---|
| H02M 1/14 | (2006.01) |
| H02M 3/158 | (2006.01) |
| H02M 1/15 | (2006.01) |
| H02M 1/44 | (2007.01) |

(52) U.S. Cl.
CPC .......... H02M 3/1584 (2013.01); H02M 1/15 (2013.01); H02M 1/44 (2013.01); H02M 1/14 (2013.01); H02M 2003/1586 (2013.01)

(58) Field of Classification Search
USPC .... 323/272, 225, 271, 282, 286; 363/39, 46, 363/47
See application file for complete search history.

(56) References Cited

U.S. PATENT DOCUMENTS

| | | | | |
|---|---|---|---|---|
| 5,959,853 | A * | 9/1999 | Kos ................................ | 363/59 |
| 6,839,252 | B2 * | 1/2005 | Tai et al. ....................... | 363/65 |
| 7,098,728 | B1 * | 8/2006 | Mei et al. ..................... | 327/538 |
| 7,233,130 | B1 * | 6/2007 | Kay ............................... | 323/222 |
| 2002/0116038 | A1 * | 8/2002 | Muuranto et al. ............. | 607/96 |
| 2004/0123167 | A1 | 6/2004 | Chapuis | |
| 2007/0069704 | A1 * | 3/2007 | Gotzenberger ................ | 323/282 |

FOREIGN PATENT DOCUMENTS

WO    WO 2005/056342 A1    6/2005

OTHER PUBLICATIONS

German Search Report dated Jul. 3, 2012 including partial English-language translation (Six (6) pages).

* cited by examiner

*Primary Examiner* — Fred E Finch, III
*Assistant Examiner* — Gustavo Rosario Benitez
(74) *Attorney, Agent, or Firm* — Crowell & Moring LLP

(57) ABSTRACT

A regulating device for a multi-phase voltage converter includes a connecting element for picking-off an input/output voltage signal at a power path of the multi-phase voltage converter, and a filter, which is configured and coupled to the connecting element so as to cause the filter to output a filter output signal, which correlates to the ripple of the input/output voltage signal. A correcting unit is configured and connected to the filter and to the multi-phase voltage converter such that, owing to the correcting unit, an actuating signal is output to the multi-phase voltage converter, which actuating signal generates a change in the ripple of the input/output voltage signal.

9 Claims, 2 Drawing Sheets

REGULATING DEVICE FOR A MULTI-PHASE VOLTAGE CONVERTER

CROSS-REFERENCE TO RELATED APPLICATION

This application claims priority under 35 U.S.C. §119 to German Patent Application No. DE 10 2008 048 017.7, filed Sep. 19, 2008, the entire disclosure of which is herein expressly incorporated by reference.

BACKGROUND AND SUMMARY OF THE INVENTION

The invention relates to a regulating device for a multi-phase voltage converter, in particular for balancing the multi-phase voltage converter and/or for optimizing the EMC (electromagnetic compatibility) behavior of the multi-phase voltage converter.

A voltage converter is an electronic circuit, which converts an input voltage into an output voltage. Voltage converters can be designed as direct current voltage converters (DC/DC), rectifiers (AC/DC), inverters (DC/AC) or transformers (AC/AC).

Parallel connected converter paths that are driven with a phase offset of phi=360°/n (n corresponds to the number of phases) are referred to as multi-phase voltage converters or multi-phase converters. The current loading of the components in the individual phases is reduced by distributing the current over a number of paths/phases. The alternating components of the paths overlap at the converter terminals and lead to smaller current loadings of the capacitors of a multi-phase voltage converter and, thus, to an enhanced EMC behavior in comparison to single phase converters. Within the scope of the invention, the term "multi-phase voltage converter" also includes current rectifiers.

In order to achieve a uniform loading of the converter phases and, thus, the components, regulating devices for balancing the phase current are used. In order to regulate the balancing of the phase current, phase current sensors for sensing the actual value current distribution are necessary. The current sensors, which are required for this purpose, in the power path of the multi-phase voltage converter generate undesired losses, which increase quadratically with the converter current (for example, shunts). Phase current sensors, which make possible a "lossless" current measurement (thus, are not placed in the power path and sense the phase currents by way of a variable that correlates to the phase current), are often expensive and/or deliver inaccurate measurement results (for example, Hall sensors, measurement of parasitic properties of the components in the power path, etc.). In particular, the absolute value of the current measurement is often loaded with a high systematic error. Often relative values can be accurately determined.

The inaccuracies occurring during current measurement, in particular during the "lossless" current measurement, in the various converter phases lead in practice to a variety of measurement errors of the phase currents. These errors, in turn, result in a voltage ripple, which also includes at low frequencies an energy component, in particular at the first switching harmonic. The distortion, generated by the switching cycle of the converter, in the EMC spectrum of a multi-phase voltage converter with the lowest frequency, is referred to as the first switching harmonic. Therefore, this distortion is especially disturbing, because filtering distortions at low frequencies requires comparatively large inductances and/or capacitances, which, on being achieved, generate high costs, entail a high weight, and necessitate a large design space.

Analogous to the above described effects of unequal phase currents, time in the actuation of the multi-phase converter (deviation from the ideal phi=360°/n) can also lead to the first switching harmonic not being compensated by a destructive overlapping. Predominantly in the case of analog regulating systems, the ageing effects and the component tolerances are the cause of these actuation time tolerances. Especially large tolerances can cause not only EMC problems, but can also result in significantly higher current loads in the capacitors at the terminals of the voltage converter. As a result, there may be thermal problems and the failure of components.

At this point, the invention is based on the problem of providing an improved regulation of a multi-phase voltage converter, in particular for balancing the multi-phase voltage converter.

This problem is solved by a preferred regulating device for a multi-phase voltage converter, including a connecting element for picking-off an input or output voltage signal (input/output voltage signal) at a power path of the multi-phase voltage converter, in particular at a converter terminal of the power path. A filter is configured and coupled to the connecting element in such a manner as to cause the filter to output a filtered output signal, which correlates to, or is a function of, the ripple of the input/output voltage signal. A correcting unit is configured and connected to the filter and to the multi-phase voltage converter such that, owing to the correcting unit, an actuating signal is output to the multi-phase voltage converter. The actuating signal generates a change, in particular an optimization or minimization, in the ripple of the input/output voltage signal and/or the filter output signal. Preferably, the change in the ripple includes a reduction in the ripple in a predefined, especially critical, frequency range.

Owing to the invention, the regulating method modifies the phase currents and the values, which correlate to said phase currents, in such a manner that the voltage ripple, caused by the measurement inaccuracy, is changed, in particular is optimized or reduced. In so doing, the reduction in the voltage ripple can be limited to a predefined critical frequency range.

In particular, a measure for the voltage ripple is used in order to influence current measurement in the individual phases.

Preferably, the filter includes a band pass filter, the transmission frequency range of which is configured in such a manner as to pass through a first switching harmonic of the clock frequency of the multi-phase voltage converter and/or a first harmonic of an electric machine (as a function of the rotational speed). Other switching harmonics of the clock frequency of the multi-phase voltage converter or other harmonics of the electric machine are not (or not so intensively) "passed through" as the first switching harmonic or the first harmonic of the electric machine. Then, the filter output signal is, in particular—especially highly—dependent on the ripple of the input/output voltage signal in the transmission frequency range, therefore, in this case dependent on the amount of the first switching harmonic of the clock frequency of the multi-phase voltage converter or the first harmonic of the electric machine. As a result, the actuating signal. of the correcting unit can produce an optimization or a reduction in the ripple in this frequency range in a targeted manner.

Preferably, the filter includes an LC resonant circuit, an active filter, based on an operational amplifier, or an adaptive digital filter, based on a frequency adaptation.

Preferably, it is provided that owing to the actuating signal, a phase current distribution regulator (device for regulating the balancing, phase current balancing) of the multi-phase voltage converter is configured in such a manner that the ripple of the input/output voltage signal is changed, in particular is optimized or reduced.

An especially preferred embodiment of the invention provides that, owing to the actuating signal, at least one phase current sensor of the multi-phase voltage converter (in particular, the scaling factor of the phase current sensor) is configured such that the ripple of the input/output voltage signal is changed, in particular is optimized or reduced.

Preferably owing to the actuating signal, the phase offset of the multi-phase voltage converter is configured such that the ripple of the input/output voltage signal is changed, in particular is optimized or reduced.

It is especially preferred that an optimization, in particular a reduction, of the ripple of the input/output voltage signal. can also be in a specific frequency band above the first switching harmonic (for example, frequency ranges for long wave, medium wave, or ultra short wave radio). To this end, the transmission range of the band pass filter is configured for the frequency range to be optimized.

When multi-phase voltage converters are used for actuating electric drives or generators (in general, electric machines), the invention can be employed for the purpose of reducing the amplitude of the first harmonic (in the case of an electric machine, the first harmonic is a function of the rotational speed). In this case, not only the optimized EMC behavior, but also the reduction in the pendulum-like swings, the lower noise loadings and the lower wear are especially advantageous. Since the rotational speed in an electric machine is variable, it is especially advantageous in this embodiment that the filter is achieved on the basis of an adaptive digital filter. However, this feature does not alter the operating principle of the regulating method of the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
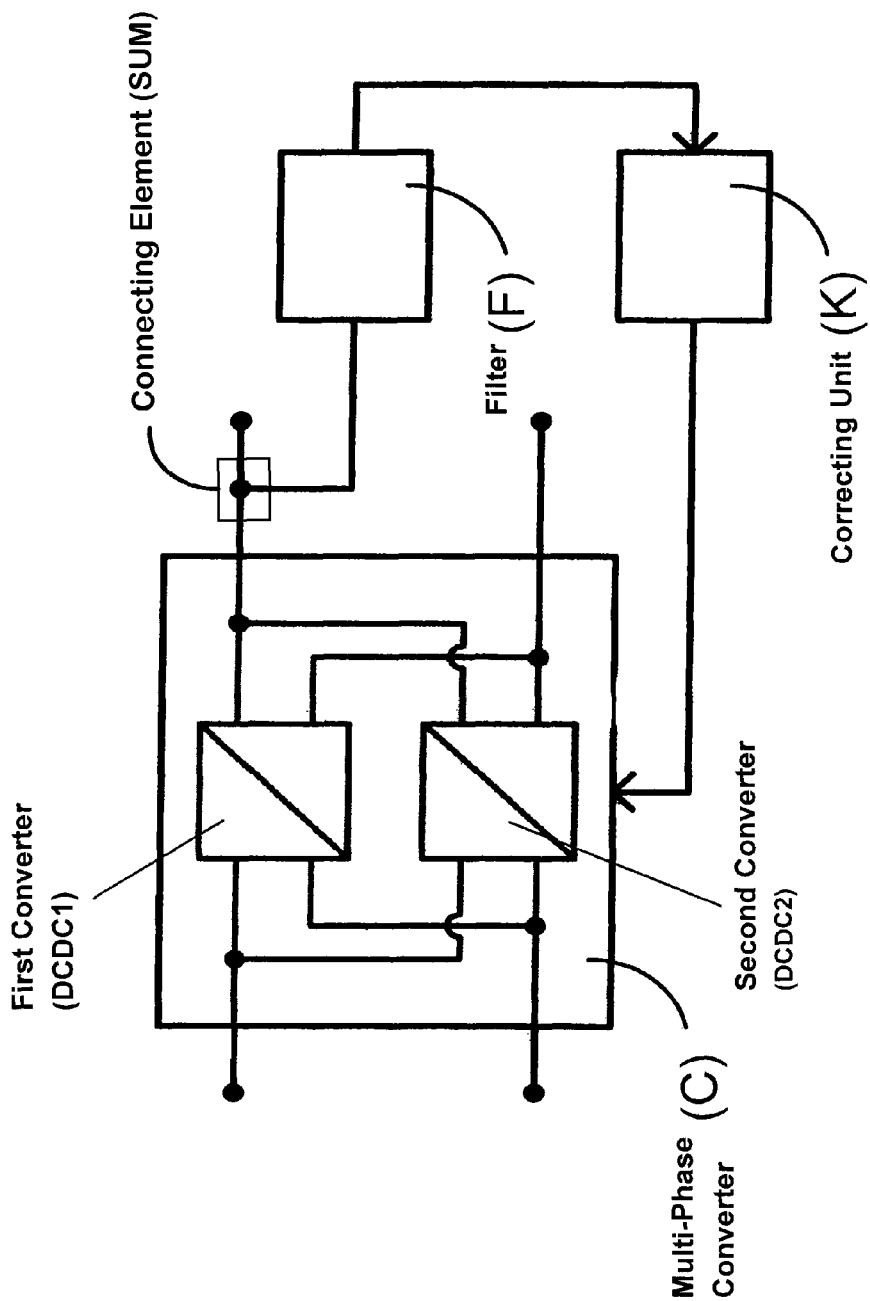
FIG. 1 is a simplified block diagram of a multi-phase voltage converter, including a regulating device.

FIG. 1 shows a multi-phase converter C and a regulating device for the multi-phase voltage converter, in particular, a device for correcting measurement errors occurring during current measurement of the multi-phase converter. The multi-phase converter C includes a first DC/DC converter DCDC1 for a first phase and a second DC/DC converter DCDC2 for a second phase.

The regulating device includes a filter F, which generates an input amount for a correcting unit K from the frequency and amplitude of the voltage ripple at a summing point Sum of the power stage of the multi-phase converter system C.

The correcting unit K compensates, for example, for the systematic measurement errors of the phase current sensors or the tolerances in the actuation of the multi-phase converter system C, so that the output amount of the filter F is minimized.

Voltage ripples at the summing points Sum of the multi-phase converter are produced as a function of the circuit topology and the switching frequency fsw of the multi-phase converter system C.

Figure 2:
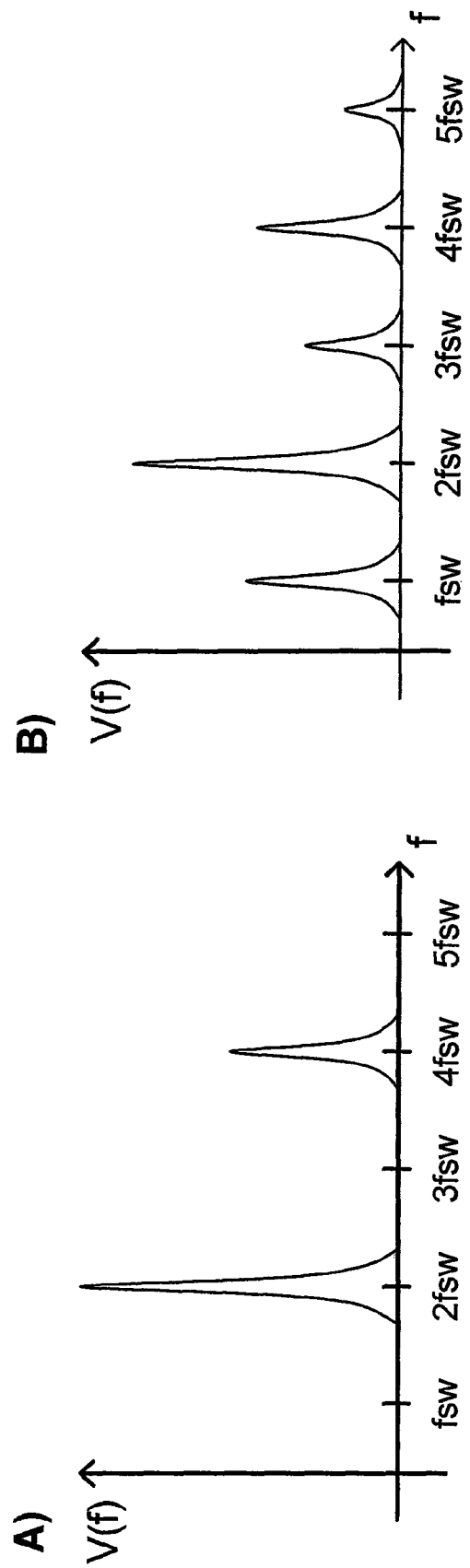
FIGS. 2(a) and 2(b) are graphs showing distortions in the input/output voltage signal of the multi-phase voltage converter with respect to the frequency range.

FIG. 2 shows the frequency spectrum of the voltage ripple of the input/output voltage signal at a power path of the multi-phase voltage converter C, in particular the function of the harmonics of the switching frequency fsw of the multi-phase converter system C. On the left hand side, FIG. 2a shows the frequency spectrum in the case of an ideal current distribution over the converter phases and in the case of an ideal actuation (phase offset). The portion of the voltage ripple in the frequency range at fsw (first switching harmonic) is equal to zero. On the right hand side, FIG. 2b shows the frequency spectrum in the case of a non-symmetrical current distribution and/or in the case of a non-ideal actuation (phase offset). In this case, no distortion is produced at fsw.

A band pass filter with the filter frequency f_BP is used as the filter F. In this context, f_BP corresponds to fsw and/or 3fsw, etc. Then, the output amount of the filter is a function of the voltage ripple components in the respective frequency ranges about fsw and/or 3fsw, etc. Thus, the output amount of the filter is minimal, if an ideal current distribution in the converter is achieved. For example, the band pass filter can be carried out by a series resonant circuit (LC oscillating circuit), by means of an active signal filter using an operational amplifier, or as a digital filter. In this context, it is advantageous that no DC component has to be measured and, thus, the transmission to the correcting unit K, for example, by means of a decoupling capacitor or a transformer, is made possible.

Owing to the correcting unit K, the output amount of the filter F is minimized. For example, this minimization is produced since the correcting unit K suitably changes or adjusts a scaling factor, an additive value, or a polynomial for one or more phase current sensor(s). In an analogous way, the correcting unit K can also produce a change or adjustment in the actuation (phase offset). For example, the scaling factor is changed by the correcting unit K by means of an optimizing operation, which is known from the prior art (for example, the gradient method, simplex search, search step method, two position controller, etc.), in such a manner that the output amount of the filter F is minimal. This means that the spectral component in the frequency range f_BP at the summing points is minimal, and in this way the current distribution and/or the actuation is (are) optimized. Thus, a systematic measurement error due to the phase current sensors or the tolerances in the actuation (phase offset) is compensated.

Independently of which systematic errors of the phase current sensors or which tolerances in the actuation are expected, the unit K adjusts, instead of the scaling factor, another value or a combination of several values. Preferably, in the case of an offset error the additive value is changed; in the case of a linearity error the scaling factor is changed; and, in the case of nonlinear errors the factors of a polynomial for scaling the sensor values are changed.

The exemplary regulating device has several advantages:
(1) The effects of the measurement errors of the phase current sensors on the voltage ripple at the converter terminals can be compensated. A "lossless" current measurement is possible, for example, by means of parasitic resistors in the components in the power path even in the case of high requirements on the phase current distribution.

(2) Cost reduction is obtained on the grounds of a simplified sensor concept.

(3) Smaller losses occur because the sensors do not have to be placed in the current carrying path, and because less precise "lossless" sensors can be used.

(4) Compensation of the measurement error occurs in parallel to the voltage converter regulation. Consequently, there is no dependence on the regulating concept of the voltage converter.

(5) Higher quality of phase current distribution occurs, which enables an improved EMC behavior and lower component stress.

(6) There is an optimization potential of pendulum moments in electric machines and, as a result, a reduction in the noise, wear and loss. Redundant information about phase current behavior is available in order to make possible fail-safe strategies.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A regulating device coupled to a multi-phase voltage converter, comprising:
    a connecting element for picking-off an input or output voltage signal at a terminal of the multi-phase voltage converter;
    a filter, which is coupled to the connecting element such that the connecting element is connected between the filter and the multi-phase voltage converter, and wherein the filter is configured to output a filter output signal from a frequency and amplitude of a ripple of the input or output voltage signal resulting from current measurement errors within the multiphase voltage converter; and
    a correcting unit, which is coupled to the filter and to the multi-phase voltage converter and is configured to receive the filter output signal from the filter, and wherein the filter is connected between the connecting element and the correcting unit, wherein the correcting unit is configured to output an actuating signal to the multi-phase voltage converter,
    wherein the multi-phase voltage converter is configured to compensate for said current measurement errors by changing, in response to the actuating signal, the ripple of the input or output voltage signal.

2. The regulating device according to claim 1, wherein the change in the ripple of the input or output voltage signal is one of an optimization and minimization in the ripple of the input or output voltage signal.

3. The regulating device, according to claim 2, wherein the filter includes a band pass filter with a transmission frequency range, wherein the transmission frequency range passes through at least one of a first switching harmonic of a clock frequency of the multi-phase voltage converter and a first harmonic of an electric machine.

4. The regulating device according to claim 2, wherein the filter is one of: an LC resonant circuit, an active filter using operational amplifiers, and an adaptive digital filter.

5. The regulating device according to claim 2, wherein, owing to the actuating signal, an actuation of the multi-phase voltage converter is configured such that the ripple of the input or output voltage signal is changed.

6. The regulating device according to claim 5, wherein the actuation of the multi-phase voltage converter is the actuation of a phase-offset of the multi-phase voltage converter.

7. The regulating device according to claim 3, wherein, owing to the regulating device, the ripple of the input or output voltage signal is changed in a defined frequency band above the at least one of the first switching harmonic of the clock frequency of the multi-phase voltage converter and of the first harmonic of an electric machine.

8. A regulating device coupled to a multi-phase voltage converter, comprising:
    a connecting element for picking-off input or output voltage signal at a terminal of the multi-phase voltage converter, wherein the input or output voltage signal is characterized by a voltage ripple resulting from current measurement errors within the multiphase voltage converter;
    a filter, coupled to the connecting element such that the connecting element is connected between the filter and the multi-phase voltage converter, and wherein the filter is configured to receive the input or output voltage signal and, in response, the filter is further configured to provide a filter output signal based on a frequency and an amplitude of the voltage ripple; and
    a correcting unit, coupled between the filter and the multi-phase voltage converter, wherein the filter is connected between the connecting element and the correcting unit, and wherein the correcting unit is configured to receive the filter output signal and, in response, the correcting unit is further configured to provide an actuating signal to the multi-phase voltage converter, and in response to the actuating signal, the multi-phase voltage converter is configured to compensate for said current measurement errors by optimizing or minimizing the voltage ripple of the input or output voltage signal.

9. The regulating device according to claim 8, wherein the filter comprises a band pass filter having a transmission frequency range for passing through at least one of a first switching harmonic of a clock frequency of the multi-phase voltage converter and a first harmonic of an electric machine.

* * * * *